April 10, 1951 — M. CASERTA — 2,548,097
VALVE
Filed March 9, 1945
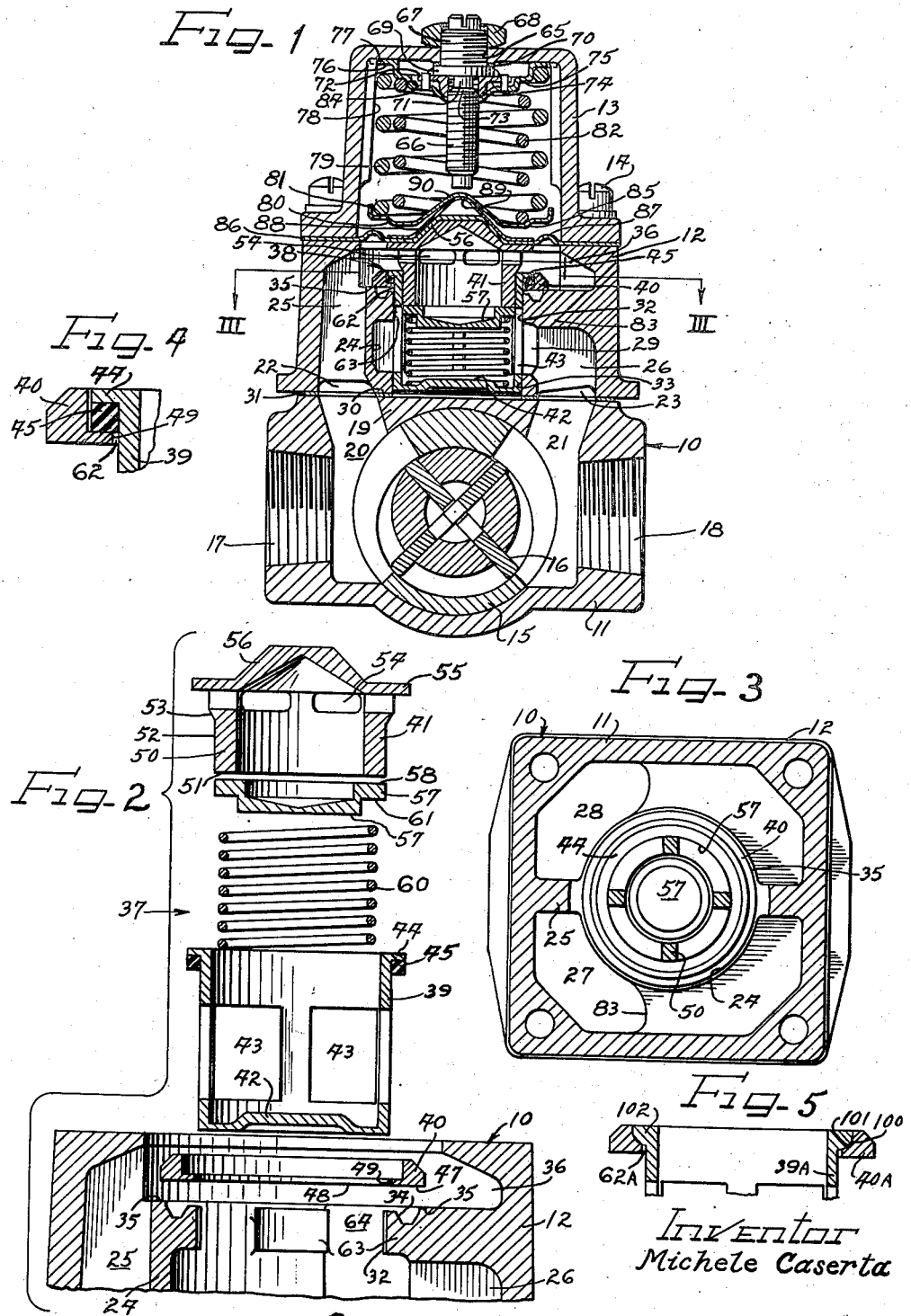
Inventor
Michele Caserta Patented Apr. 10, 1951

2,548,097

UNITED STATES PATENT OFFICE 2,548,097

VALVE

Michele Caserta, Detroit, Mich.

Application March 9, 1945, Serial No. 581,750

6 Claims. (Cl. 137—53)

This invention relates to a valve and more particularly to a relief and by-pass valve assembly for use in pumps or other fluid transfer devices.

According to the present invention, the relief valve structure is so constructed and arranged as to insure proper seating of the relief valve ring when the valve is free to close, regardless of whether the associated part of the relief valve structure is properly aligned or slightly "cocked." This result is accomplished through the use of either a resilient or spherical seating arrangement between the relief valve ring and its associated parts.

The combined relief and by-pass valve assembly of my present invention is thus so constructed as to eliminate the necessity of extremely close tolerances in the dimensions of the associated parts.

It is therefore an important object of my invention to provide a novel and improved relief valve construction whereby ease, certainty and sensitivity of operations are assured, and any danger of the relief valve being improperly or incompletely seated upon closing the valve is eliminated.

It is a further important object of this invention to provide a combined relief and by-pass valve construction of simple, yet rugged construction that is easy to manufacture and that performs satisfactorily under high speed operating conditions with a minimum of wear upon the parts and therefore a long life of usefulness.

Other and further important objects of this invention will be apparent from the disclosures in the specification and the accompanying drawings.

On the drawings:

Figure 1 is a vertical sectional view through a pump and valve assembly embodying the principles of my invention;

Figure 2 is an enlarged exploded view shown in vertical section of the relief and by-pass valve assembly;

Figure 3 is a sectional view taken substantially along the line III—III of Figure 1;

Figure 4 is an enlarged detailed sectional view of the resilient type joint of the composite relief valve of Figures 1 to 3;

Figure 5 is a vertical sectional view of a modified form of composite relief valve.

As shown on the drawings:

The reference numeral 10 indicates generally a fuel transfer mechanism, such as an aircraft fuel pump, with which is associated a relief and by-pass valve assembly of my invention. Said pump comprises a pump casing 11, a valve housing 12 mounted thereon, and a valve housing cover 13 secured to said housing 12 and to the pump casing 11 by means of bolts 14. The pump here illustrated is of the rotary vane type, the bore of the pump casing 11 being provided with a pump liner 15, within which a rotor 16 is adapted to be driven. The pump casing 11 is provided with an intake 17 and an outlet 18 for connecting the pump in a fuel line to an engine, or to any other point to which fuel is to be delivered. Internally, the pump casing is divided by a transverse partition 19, on the intake side of which is formed a port 20 and on the outlet side of which is formed a port 21, both of which are in flow communication with interior passages 22 and 23, respectively, of the valve housing 12.

Said valve housing 12 is formed with an axially concentric, annular partition 24, which, as best shown in Figure 3, is integrally cast with the valve housing 12, to which it is connected by diametrally opposed vertical web portions 25 and 26. A horizontally extending web 83 connects said pump housing to somewhat more than one-half the periphery of said annual partition on the outlet side of said housing to provide an upper chamber 36 and a lower chamber 29. On the intake side of the partition 24, the web 25 divides the passage 22 into a pair of vertical passages 27 and 28 (Fig. 3). On the outlet side of said annular partition 24 below said horizontal web 83, the passage 23 is divided vertically by the web 26 into two passages both of which communicate with the lower chamber 29 (Fig. 1) of the annular partition 24. The lower annular edge 30 of said annular partition 24 is adapted to rest directly upon a gasket 31 that seals the joint between the pump casing 11 and valve housing 12.

Said annular partition 24, which is open at both its upper and lower ends, is further provided with a lower cylindrical well 33, and with peripherally equi-spaced inwardly projecting lugs 63 having inner segental cylindrical surfaces 32 defining a cylinder coaxial with the well 33 and of the same diameter. The upper surfaces of the lugs 63 are relieved, as by an arcuate channel 34, adjacent the edges of the segmental cylindrical surfaces 32. Outwardly of said channel the horizontal web 83 and the partition 24 provide together an annular plane seating surface 35 that is elevated above the upper edges of said lugs 63.

A relief and by-pass valve assembly, indicated generally by the reference numeral 37 (Fig. 2) is adapted to be assembled in nested relationship within the valve housing 12. Said assembly comprises a composite relief valve 38 (Fig. 1)

which includes a lower ported cylinder 39 extending through the segmental cylindrical portions 32 into the well 33, a relief valve ring 40, and an upper ported cylindrical member 41 telescopingly nested within said lower cylindrical member 39. Said cylindrical member 39 is provided with a closed, upwardly dished bottom 42 and with ports 43 in its cylindrical wall portion. The lower cylindrical portion of said member 39 fits snugly but slidably within the cylindrical wall 32. The ports 43 are in flow communication with the annular passage 29. The upper end of said cylindrical member 39 is provided with an outwardly turned annular flange 44 against the under side of which is positioned a gasket 45, the gasket 45 being preferably of resilient material such as rubber. The external diameter of the gasket 45 is preferably equal to the external diameter of the annular flange 44.

The annular relief valve ring 40 is provided with a plane lower seating face 47 (Fig. 2) adapted to seat against the seating surface 35 when the relief valve is closed. Said relief valve ring 40 is further provided with a lower, inturned annular flange 48 that defines a very thin cylindrical wall 49 of only slightly greater diameter than the external diameter of the cylindrical wall of the member 39. The clearance 62 so provided permits a slight relative tilting movement between said ring 40 and cylindrical member 39. When the ring 40 and cylindrical member 39 are in assembled relationship, the gasket 45 fills the space between the upper flange 44 of the cylindrical member 39 and the lower flange 48 of the ring 40. It is due to the resiliency of the gasket 45 that the relative tilting movement referred to is made possible. Thus, even though the cylindrical member 39 may be slightly misaligned, the relief valve ring 40 is free to seat properly upon the seating surface 35, when the relief valve is closed, so as to prevent any leakage of fluid.

The upper cylindrical member 41 is provided with a lateral wall 50 having a lower annular plane face 51 (Fig. 2) and an outer surface that is cylindrical, as at 52, for most of its length, but is outwardly flared at its upper end, as at 53. The diameter of said cylindrical surface 52 is such as to permit the member 41 to be slidably nested within the lower cylindrical member 39. The outwardly flared portion 53 causes the members 41 and 39 to move together as a unit under the influence of forces tending to move the member 41 downwardly or to move the member 39 upwardly. The upper portion of the wall 50 is provided with lateral ports 54 that establish communication between the inside of the relief valve assembly and the annular passage 36 in the valve housing. Said member 41 has an upper wall forming a conical pilot abutment 56 and a surrounding annular flange 55.

The by-pass valve comprises a disc 57 having an upper plane annular seating face 58 (Fig. 2) adapted to seat against the lower plane annular face 51 of the member 41. Said by-pass valve disc 57 is provided with a downwardly extending cylindrical central portion 59, which serves to center a spring 60 that is held under compression between the closed bottom 42 of the lower cylindrical member 39 and the under surface 61 of the by-pass valve disc 57.

The top wall of the cover 13 for the valve housing 12 is provided with a central threaded opening 65. A relief pressure regulating mechanism is housed within said cover 13. Said mechanism comprises a pressure adjusting member 66 having an upper threaded end 67 threaded through said opening 65 with an upper projecting portion thereof provided with an external nut 68 for holding said pressure adjustment member in the desired position. Beneath the upper threaded end 67, the pressure adjustment member 66 is provided with an integrally formed annular enlargement or collar 69, between which and the under side of the top wall of the cap 13 is positioned a sealing gasket 70. Said pressure adjustment member 66 is further provided with a reduced portion 71, positioned immediately below the collar 69, for receiving a flanged nut washer 72. Said nut washer 72 has a central portion that is seated upon the reduced portion 71 and then upon the shoulder 73 formed on said pressure adjusting member 66 so as to be fixed against longitudinal displacement with respect to said member. Said washer 72 is provided with a lower outer surface 74 that is segmental spherical to afford a spherical bearing surface for a spring retaining washer 75.

Said washer 75, which may suitably be formed from a metal stamping, is provided with an upper outer annular flange 76, which is recessed, as at 77 at diametrically spaced points about its periphery for receiving vertical guiding ribs 78 that are formed on the inner wall of the cover 13. The washer 74 is thus prevented by the interengagement of the ribs 78 in the recesses 77 from turning movement as the pressure adjustment member 66 is turned.

A relatively heavy coiled spring 79 is positioned coaxially about the pressure adjustment member 66 with its upper turn bearing against the annular flange 76 of said washer 74, and with its lower end bearing against a bottom washer 80 having an upwardly turned peripheral flange 81 for receiving said bottom turn of the spring 79. An inner oppositely coiled spring 82 is similarly held under compression between the upper washer 74 and the lower washer 80 with the respective end turns of said spring positioned in grooves 84 and 85 formed for the purpose in said washers.

A thin flexible diaphragm 86 is clamped between the lower flanged periphery of the cover 13 and the upper annular surface of the valve housing 12. Said diaphragm 86 is preferably provided with an annular loop 87 between its outer confined peripheral portion and its confined central portion so as to permit freedom of movement of said central portion in either direction. The central portion of said diaphragm 86 is confined against the upper conical portion 56 of the relief valve part 41 by means of a washer 88. Said washer 88 has a conical portion conforming with the conical abutment 56 and terminating in a rounded dome 89 which bears upwardly against a similarly conformed central portion 90 of the washer 80.

The arrangement of washers just described insures the transmission of an axial thrust only from the springs 79 and 82 through the diaphragm 86 against the upper relief valve member 41. Any tendency of the springs 79 and 82 to become cocked or to exert torsional forces during compression or expansion is compensated for by the provision of the upper and lower spherical seats for the upper and lower washers 75 and 80, respectively. By reason of this construction, therefore, the pressure adjustment member 66 can be so adjusted as to give the desired amount of pressure upon the relief valve with the certain knowledge that the relief valve will remain closed until that amount of pressure is exceeded.

In assembling the parts of the composite relief and by-pass valves within the valve housing 12, as should be apparent from Figure 2, the relief valve ring 40 is first centered upon the seat 35. The lower cylindrical member 39 next dropped through the ring 40 until the gasket 45 rests upon the inturned flange 48 of said ring. In this position, there is a slight clearance, as indicated at 62 (Fig. 4) between the inner edge 49 of said ring and the outer cylindrical wall of said member 39.

The member 39 extends into the cylindrical well 33 and adjacent its upper end is guided by the segmental cylindrical wall 32 of the peripherally spaced lugs 63. The vertical spaces 64 (Fig. 2) between the lugs 36 provide fluid flow passages, as will be later explained. The coiled spring 60 is next dropped into place within the cylindrical member 39, the upwardly dished bottom wall 42 of which serves to position said spring 60 coaxially thereof. Next, the by-pass valve disc 57 is dropped into the cylindrical member 39 on top of the coil spring 60 so that the upper turn of the spring bears against the lower annular wall 61 of said disc. The upper cylindrical member 41 is then telescopically inserted within the lower cylindrical member 39, with which, because of the relative dimensions, it has a sliding fit.

The diaphragm 86 is next positioned over the valve housing 12, the washer 88 laid on top and the washer 85 centered thereon. Then the coiled springs are supported upon the washer 85 and the cover 13 with the assembled pressure adjustment member 66 and associated parts slipped over and held against the valve housing while the bolts 14 are threaded home.

In normal operation, the pump rotor 16 takes fluid in through the intake 17 and discharges it through the outlet 18. The amount of compression impressed upon the springs 79 and 82 by the adjustment of the pressure adjusting member 66 determines the pressure at the outlet side of the rotor 16. When that pressure is exceeded, fluid at the outlet side of the rotor passes from the chamber 21 upwardly into the vertical passage 23 into the annular passage 29 and upwardly through the spaced vertical passages 64 against the under side 47 of the annular relief valve ring 40, thereby causing said ring to be lifted from its seat 35. Upward movement of the relief valve ring 40 causes a corresponding upward movement of the lower cylindrical member 39, which is translated through the shoulder 53 to cause upward movement of the upper cylindrical member 41 against the diaphragm 86 and pressure of the springs 79 and 82. The raising of the annular ring 40 provides a flow passage for fluid from the vertical passages 64 into the annular passage 36 and thence downwardly through the pair of passages 27 and 28 into the passage 22 to the intake side 20 of the pump housing. The pressure on the outlet side of the rotor 16 is thus relieved until a pressure below that for which the regulating mechanism is set is again reached, whereupon the relief valve ring 40 is caused to seat under the action of the springs 79 and 82 as exerted through the diaphragm 86 and the upper relief valve part 41.

In the event the rotor 16 ceases to be driven and it is desired to by-pass fluid through the pump and valve assembly, any fluid under pressure entering the intake port 17 will flow upwardly through the passages 20, 22, 27 and 28, and laterally into the annular passage 36 and through the ports 54 into the interior of the upper relief valve member 41 to act downwardly against the by-pass valve disc 57 and thereby depress the same against the action of the spring 60. The fluid then flows downwardly through the opening afforded by unseating the by-pass valve disc 57 into the annular passage 29 and thence downwardly through the passage 23 into the outlet chamber 21 of the pump housing and out through the outlet port 18 into the line. Since the spring 60 is very light indeed, the amount of fluid pressure necessary to unseat the by-pass valve disc 57 from its seat 51 is almost negligible. Only a slight amount of downward displacement of the by-pass disc 57 is sufficient to provide an opening of comparatively large area through which fluid may flow downwardly past said disc 57.

As previously described, the provision of the resilient gasket 45 in conjunction with the clearance 62 between the inturned lower flange 48 of the annular relief valve member 40 and the outer wall of the cylindrical member 39, permits said annular member 40 to seat squarely upon its seat 35 regardless of a slight cocking or misalignment of the cylindrical member 39. This is an important feature that insures quick closing of the relief valve and prevents undesirable leakage through the relief valve.

This same result may be accomplished in a different manner, as indicated in the construction of the modified form of my invention illustrated in Figure 5, in which the reference numeral 40A indicates a relief valve ring and 39A represents the lower cylindrical member corresponding with the relief valve part 39. Instead of employing resilient material, such as the resilient gasket 45, in order to obtain relative tilting movement between the ring 40A and the cylindrical member 39A, these parts are provided with cooperating segmental spherical surfaces 100 and 101, respectively. The segmental spherical surface 100 is formed on the inside of the ring 40A, while the segmental spherical surface 101 is formed on the outside of the upper annular end 102 of the cylindrical member 39A. In place of conforming segmental spherical surfaces, the surface 100 can be conical in contour. Any other contour of surfaces can be used that will provide for limited relative tilting movement between the relief valve ring 40A and the cylindrical member 39A, so as to insure accurate seating of said ring when the relief valve is closed.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A relief valve for a cylindrical relief port having a surrounding plane seating surface at right angles to the axis of said cylindrical relief port, a cylindrical member axially movable in said port, an annular member movable with said cylindrical member into and out of port closing position, and means including resilient means between cooperating surfaces of said members providing limited tilting movement between said members to permit said annular member to seat properly on said seating surface when said members move into port closing position.

2. A relief valve for a cylindrical relief port having a surrounding plane seating surface at right angles to the axis of said cylindrical relief port, a cylindrical member axially movable in said port, an annular member movable with said cylindrical member into and out of port closing position, and means including cooperating relatively tiltable surfaces providing limited tilting movement between said members to permit said annular member to seat properly on said seating surface when said members move into port closing position.

3. A relief valve for a cylindrical relief port having a surrounding plane seating surface at right angles to the axis of said cylindrical relief port, a cylindrical member axially movable in said port, an annular member movable with said cylindrical member into and out of port closing position, and means including cooperating segmental spherical surfaces providing limited tilting movement between said members to permit said annular member to seat properly on said seating surface when said members move into port closing position.

4. A relief valve comprising a ported cylindrical member having an out-turned annular flange, a ring having an inside diameter slightly greater than the diameter of said flange to receive said flange and having a bottom plane seating face, said ring also having an inturned annular flange adapted to be positioned in spaced relation below said first flange and having an inside diameter greater than the outside diameter of said cylindrical member to provide tilting clearance therebetween, and a resilient gasket between said flanges to permit slight relative tilting movement between said ring and said member in order to insure proper seating of said seating face.

5. In a combined relief and by-pass valve assembly, a first cylindrical member having a closed bottom and a ported cylindrical wall and provided with an upper outwardly projecting annular flange, a relief valve ring enclosing said flange and having an inturned flange spaced freely below said first flange, a resilient gasket positioned between said spaced flanges, a second cylindrical member slidably mounted within said first cylindrical member and having upper lateral ports and a lower open end, a by-pass valve disk slidably positioned in said first cylinder below said second cylinder, and a spring held under compression between said closed bottom and said disk to urge the latter into seated relation against said lower open end.

6. In a valve assembly including a casing having upper and lower passaged portions and an intermediate ported partition providing an annular relief valve seat and a well beneath said port, a combined relief and by-pass valve assembly mounted in said casing comprising a cylindrical member of lesser diameter than and movable in said port and having a closed bottom extending into said well and lateral ports in communication with said lower passaged portion, said cylindrical member also having an upper peripheral flange, a free-floating relief valve ring surrounding said flange and movable with said cylindrical member to close said port, means asssociated with said flange and ring permitting limited tilting movement between said ring and cylindrical member to insure proper seating of said ring to close said port when in port closing position, a spring pressed by-pass valve disk within said cylindrical member, and a hollow cylindrical member telescopingly fitted in said first cylindrical member and provided with ports for flow communication between said upper passaged portion and the interior of said hollow cylindrical member, said hollow cylindrical member having a lower plane annular surface forming a seat against which said by-pass disk is normally spring pressed to close the lower end of said hollow cylindrical member.

MICHELE CASERTA.

REFERENCES CITED

The following references are of record in the file of this patent:

UNITED STATES PATENTS

| Number | Name | Date |
| --- | --- | --- |
| 50,443 | Bristol | Oct. 17, 1865 |
| 485,984 | Randall | Nov. 8, 1892 |
| 874,652 | Bailey | Dec. 24, 1907 |
| 1,586,347 | Wilson | May 25, 1926 |
| 1,618,113 | Shannon | Feb. 15, 1927 |
| 1,786,885 | Bancroft | Dec. 30, 1930 |
| 1,990,557 | Melott | Feb. 12, 1935 |
| 2,353,545 | Caserta | July 11, 1944 |
| 2,353,610 | Chrisholm | July 11, 1944 |

FOREIGN PATENTS

| Number | Country | Date |
| --- | --- | --- |
| 6,283 | Great Britain | of 1890 |